No. 727,491. PATENTED MAY 5, 1903.
W. TAYLOR.
VALVE FOR FLUSH TANKS.
APPLICATION FILED JAN. 20, 1902.
NO MODEL.
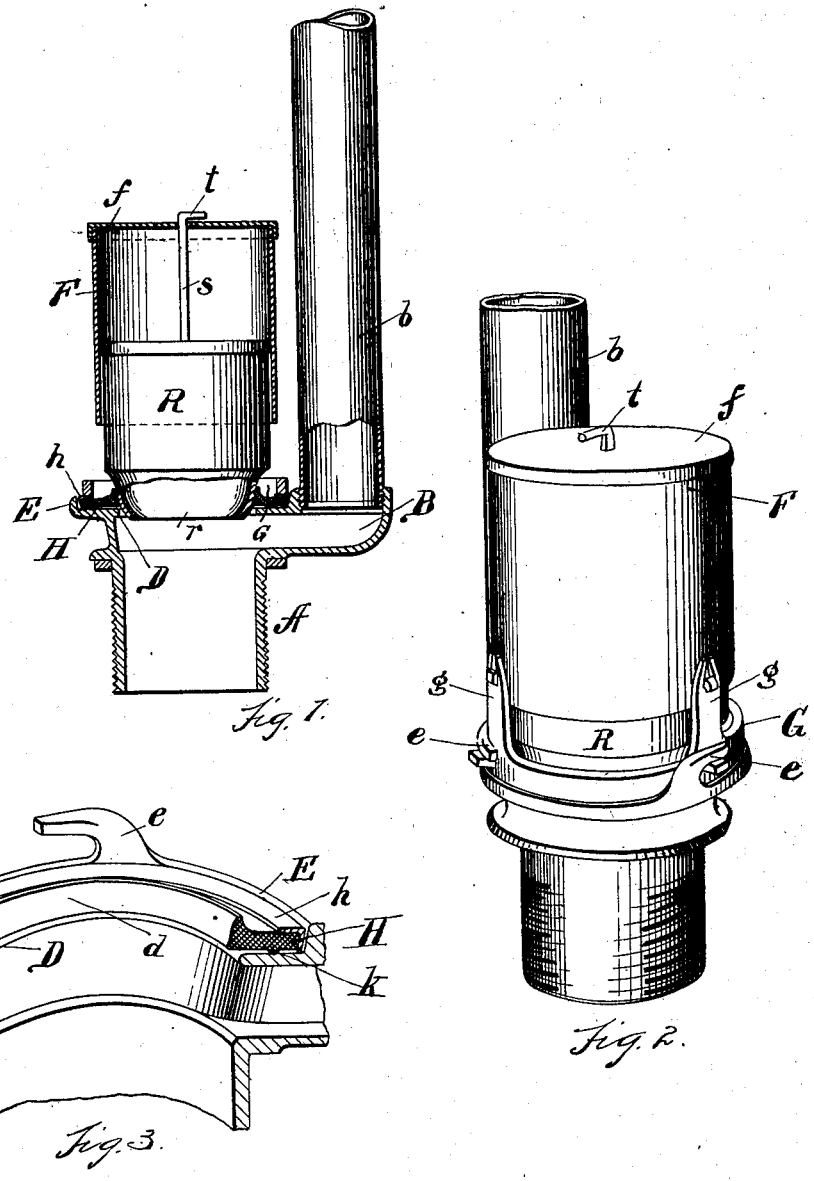
WITNESSES
INVENTOR
William Taylor
By Parker & Burton
Attorneys.

No. 727,491. Patented May 5, 1903.

UNITED STATES PATENT OFFICE.

WILLIAM TAYLOR, OF DETROIT, MICHIGAN, ASSIGNOR TO THE IDEAL MANUFACTURING COMPANY, OF DETROIT, MICHIGAN.

VALVE FOR FLUSH-TANKS.

SPECIFICATION forming part of Letters Patent No. 727,491, dated May 5, 1903.

Application filed January 20, 1902. Serial No. 90,398. (No model.)

*To all whom it may concern:*

Be it known that I, WILLIAM TAYLOR, a citizen of the United States, residing at Detroit, county of Wayne, State of Michigan, have invented a certain new and useful Improvement in Valves for Flush-Tanks; and I declare the following to be a full, clear, and exact description of the invention, such as will enable others skilled in the art to which it pertains to make and use the same, reference being had to the accompanying drawings, which form a part of this specification.

This invention relates to valves for flush-tanks, and has for its object an improved valve and valve-seat adapted to be used in that style of flush-tanks in which the flushing-water is delivered through a downflow-pipe when the valve is lifted and in which the valve after being lifted remains in an elevated position until the tank has been emptied and then automatically drops to its seat, closing the orifice into the outflow-pipe, and remains in its position of closure until it is again mechanically lifted.

The improvements relate to the form of structure which render it unnecessary to machine or tool the valve-seats and make it possible to produce a perfectly tight packing with the use of castings in the condition they are in when leaving the mold.

They relate also to the valve-seat, which is formed from a flexible material and is arranged to have the hollow cup-valve seat as a plug in the opening thereof.

It also relates to the means employed to bring about a quick coupling and uncoupling of the cage which holds the valve from the fixture which contains the valve-seat.

In the drawings, Figure 1 is a view partly in section, the section being taken vertically through the several parts. Fig. 2 is a perspective of the valve. Fig. 3 is a perspective of a segment of the coupling which contains the outlet and the valve-seat connected therewith.

A indicates a fixture, which comprises that part of the coupling which passes through the bottom of the tank, threaded at its lower end to engage with the pipe leading from the tank and provided with an overflow connection B, into which an overflow-pipe $b$ is engaged with a gasket-seat D for a flexible ring H, which contains the valve-seat $d$. The gasket-seat D is surrounded by a flange E, from which rises several hooks $e$.

F indicates a guard-chamber made in the form of a hollow cylinder and having the upper end closed in by a cap $f$, so that the structure constitutes an inverted cup the walls of which are cylindrical and vertical. This cup is supported on struts $g$, and each of the several struts is provided with a foot adapted to engage under the hook $e$, and by this means the inverted cup F is held in position with respect to the flange E. A ring G connects the lower foot ends of the struts $g$ and forms a bearing that rests inside the flange E on a protecting-ring $h$, that bears on a packing-gasket H, preferably made of comparatively soft rubber. The gasket H is annular, and the inner edge is provided with an upwardly-extending knife-edged flange, which forms the valve-seat $d$, in which the valve, hereinafter described, engages. The upturned edge of the flange is thin and flexible. On the under side of the gasket H is an annular rib $k$, that serves to produce a close engagement against the seat D notwithstanding any irregularities of surface that may have been made in the construction of that part of the coupling.

The guide F, the struts which support it, and the ring G comprise a cage through which the water can flow freely from the tank into the outlet-pipe. A cylindrical bell R, made of a shape and size to engage somewhat closely inside the guide F, is provided on its lower side, which is otherwise open, with a contracted terminal, which has the opening $r$. The smaller part of the terminal is considerably smaller than the opening through the gasket H, and the upper part is considerably larger than said opening. The bell-valve R is hung in the guide F, substantially concentric with the opening through the gasket H, and the bell is provided with a lifting-rod S, that extends through the upper cap $f$ of the guide and terminates at its upper extremity with a hook $t$, by means of which it may be secured to the appliance used to lift the bell R out from engagement with the seat $d$ in the gasket H. The bell R is normally full of air and empty of water. The guard F outside the bell is usually full of water when the tank is full; but there is sufficient clearance between the guard and the bell and between the stem S and the cap $f$ to allow the contained water to be driven out when the bell is manually lifted. The clearance, however, is not so great as to allow the water thus driven out to flow back immediately; but it can only flow back slowly, and meantime the tank has been emptying rapidly through the orifice in the gasket H. Moreover, during the period of emptying the bell, which was itself full of air, is buoyant and tends to float and tends of itself to remain in an elevated position in the guard because of its buoyancy. The conical terminal of the bell projects through the orifice in the flexible gasket H, into which the bell is forced by its own weight and by the pressure due to the water in the tank, and this forms a perfectly tight joint.

The ring $h$ protects the soft rubber gasket from abrasion by the ring G when the parts are assembled and the downturned flange $m$ causes the ring to assume and maintain an accurately circular shape, even though the gasket may have been somewhat warped or drawn out of shape previous to use.

What I claim is—

1. In a valve for water-tanks, a passage for water, a seat for a gasket at the entrance to said passage and a flexible gasket engaging said seat and adapted around its inner edge to form the seat for a conical valve, said gasket being provided with a flexible annular projection forming an extension of the valve-seat.

2. In a valve for water-tanks, a passage for water, a seat for a gasket at the entrance to said passage, a flexible gasket engaging said seat and adapted around its inner edge to form the seat for a conical valve, said gasket being provided with a flexible annular projection the inner surface of said projection forming an extension of said valve-seat, and an annular clamping-ring adapted to force said gasket against its seat outside of said annular projection.

3. In a valve for water-tanks, the combination of an outlet-fixture provided with holding means, and with a seat for a flexible gasket, a cage provided with means adapted to engage with the holding means of the outlet-fixture, a hollow valve arranged in the cage and having its walls adapted to engage as a cone through an orifice in said gasket, substantially as described.

4. In a valve for water-tanks, the combination of an outlet-fixture provided with a seat for a flexible gasket, a flexible gasket having an orifice therethrough, and a knife-edged flange surrounding said orifice, a hollow valve arranged to engage through said orifice, and means for holding said valve properly located with reference to said gasket, substantially as described.

5. In a valve for water-tanks, the combination of an outlet-fixture provided with a seat for a flexible gasket, a flexible gasket, a flanged metallic ring arranged to surround said gasket and protect the upper surface thereof, a cage provided with a ring adapted to engage over the protecting part of said gasket-ring, means for holding the cage to the fixture, and a valve arranged to be guided by the cage, and to close into an orifice through said gasket, substantially as described.

In testimony whereof I sign this specification in the presence of two witnesses.

WILLIAM TAYLOR.

Witnesses:
MAY E. KOTT,
T. GLUASSEY.